(12) United States Patent
Wang et al.

(10) Patent No.: US 7,057,392 B2
(45) Date of Patent: Jun. 6, 2006

(54) METHOD AND APPARATUS FOR DIRECTIONAL RESISTIVITY MEASUREMENT WHILE DRILLING

(75) Inventors: Tsili Wang, Katy, TX (US); Leonty Tabarovsky, Cypress, TX (US); Boris Tchakarov, Katy, TX (US); John Signorelli, Cypress, TX (US); Sheng Fang, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 321 days.

(21) Appl. No.: 10/656,683

(22) Filed: Sep. 5, 2003

(65) Prior Publication Data

US 2004/0113626 A1 Jun. 17, 2004

Related U.S. Application Data

(60) Provisional application No. 60/408,615, filed on Sep. 6, 2002.

(51) Int. Cl.
*G01V 3/08* (2006.01)
*G01V 3/10* (2006.01)

(52) U.S. Cl. .................................... 324/338; 324/339
(58) Field of Classification Search .......... 324/338–344
See application file for complete search history.

(56) References Cited

U.S. PATENT DOCUMENTS

| 4,536,714 A | 8/1985 | Clark |
| 4,766,384 A * | 8/1988 | Kleinberg et al. .......... 324/339 |
| 5,138,263 A * | 8/1992 | Towle .......................... 324/338 |
| 5,491,488 A | 2/1996 | Wu |
| 5,530,358 A | 6/1996 | Wisler et al. |
| 6,297,639 B1 | 10/2001 | Clark et al. |
| 6,577,129 B1 | 6/2003 | Thompson et al. |

\* cited by examiner

*Primary Examiner*—Bot Ledynh
*Assistant Examiner*—Reena Aurora
(74) *Attorney, Agent, or Firm*—Madan, Mossman & Sriram, P.C.

(57) ABSTRACT

A resistivity tool has a body with at lest one pair of grooves on its exterior oriented orthogonal to the tool axis. A coil antenna is oriented orthogonal to the grooves in a hole intersecting the grooves and oriented orthogonal to the tool axis. The antenna and an antenna core define a plurality of small antenna loops.

23 Claims, 6 Drawing Sheets

TOP VIEW

METHOD AND APPARATUS FOR DIRECTIONAL RESISTIVITY MEASUREMENT WHILE DRILLING

CROSS REFERENCE TO RELATED APPLICATIONS

This patent application claims priority from U.S. Provisional Patent Application Ser. No. 60/408,615 filed on Sep. 6, 2002 entitled Method and Apparatus for the Use of Multicomponent Induction Tool and Cross Component Measurements for Geosteering and Formation Resistivity Data Interpretation in Horizontal Wells" by Tsili Wang, et al. which is incorporated herein by reference in its entirety.

BACKGROUND OF THE INVENTION

1. Field of the Invention

The invention is related generally to the field of electrical resistivity well logging methods. More specifically, the invention is related to a method and apparatus for providing a transverse coil and measuring cross-component magnetic fields in a downhole resisitivity tool.

2. Description of the Related Art

Electromagnetic induction and wave propagation logging tools are commonly used for determination of electrical properties of formations surrounding a borehole. These logging tools give measurements of apparent resistivity (or conductivity) of the formation that, when properly interpreted, reasonably determine the petrophysical properties of the formation and the fluids therein.

The physical principles of electromagnetic induction resistivity well logging are described, for example, in H. G. Doll, *Introduction to Induction Logging and Application to Logging of Wells Drilled with Oil-Based Mud*, Journal of Petroleum Technology, vol. 1, p.148, Society of Petroleum Engineers, Richardson, Tex. (1949). Many improvements and modifications to electromagnetic induction resistivity instruments have been devised since publication of the Doll reference, supra. Examples of such modifications and improvements can be found, for example, in U.S. Pat. Nos. 4,837,517; 5,157,605 issued to Chandler et al.; and U.S. Pat. No. 5,452,761 issued to Beard et al.

A typical electrical resistivity-measuring instrument is an electromagnetic induction military well logging instrument such as described in U.S. Pat. No. 5,452,761 issued to Beard et al. The induction logging instrument described in the Beard '761 patent includes a number of receiver coils spaced at various axial distances from a transmitter coil. Alternating current is passed through the transmitter coil, which induces alternating electromagnetic fields in the earth formations. Voltages, or measurements, are induced in the receiver coils as a result of electromagnetic induction phenomena related to the alternating electromagnetic fields. A continuous record of the voltages form curves, which are also referred to as induction logs. The induction instruments that are composed of multiple sets of receiver coils are referred to as multi-array induction instruments. Every set of receiver coils together with the transmitter is named as a subarray. Hence, a multi-array induction consists of numerous subarrays and acquires measurements with all the subarrays.

Conventional induction tools comprising only coaxial transmitter-receiver coil configurations do not have azimuthal sensitivity. Therefore, in a horizontal wellbore, the data do not contain information about directionality of the formation. therefore, It is not possible to distinguish whether a layer is above or below the borehole from these data alone.

There is a need to be able to determine directionality of the formation for use in, e.g., geosteering. This directionality knowledge can be obtained using a subset or all of the cross-components of the new multi-component induction tool to allow determination of directionality of the formation.

SUMMARY OF THE INVENTION

The present invention provides a method and apparatus for measuring cross-component providing magnetic field in a downhole resistivity tool for traversing a formation well bore measuring a property of interest in a formation adjacent the well bore, the down hole tool having a body with a longitudinal axis substantially aligned with a longitudinal axis of the well bore, the body having a external surface and a plurality of grooves cut in the external surface tool body and oriented perpendicular horizontally with respect to the antenna coil wire. For instance, if a longitudinal axis of the tool body. A transverse coil whose coil plane contains the longitudinal axis of the tool body is used is used as a transmitter or receiver, the plurality of grooves are provided. An antenna is placed in the grooves for transmission or reception of a transverse magnetic field.

Directional resistivity measurement while drilling (MWD) provides information on formation's resistivity azimuthal changes around the measuring device mounted close to the drill bit. One application of such measurement is in geosteering in which the azimuthal resistivity information helps determine the location of nearby zones (e.g., water zone or shale layers) relative to the drill bit., of different resistivities. This information helps keep the drill bit inside of target layers, i.e., hydrocarbon pay zones. Commercially available electromagnetic MWD devices (e.g., MPR and EWR) have been used to provide real-time formation resistivity properties for geosteering and formation evaluation. These tools, however, employ coaxial-coil transmitters and receivers and are lack of azimuthal resolution. The present invention provides a method and apparatus for measuring using a cross-component magnetic field in a multicomponent resistivity logging-while-drilling tool in a substantially horizontal borehole. Using data recorded with a single receiver or a plurality of receivers associated with a single transmitter or a plurality of transmitters with two different transmitter orientations, it is possible to determine the direction of resistive beds relative to the borehole.

BRIEF DESCRIPTION OF THE DRAWINGS

The invention is best understood by reference to the following figures wherein like numbers refer to like components.

DESCRIPTION OF EXEMPLARY EMBODIMENT

Figure 1:
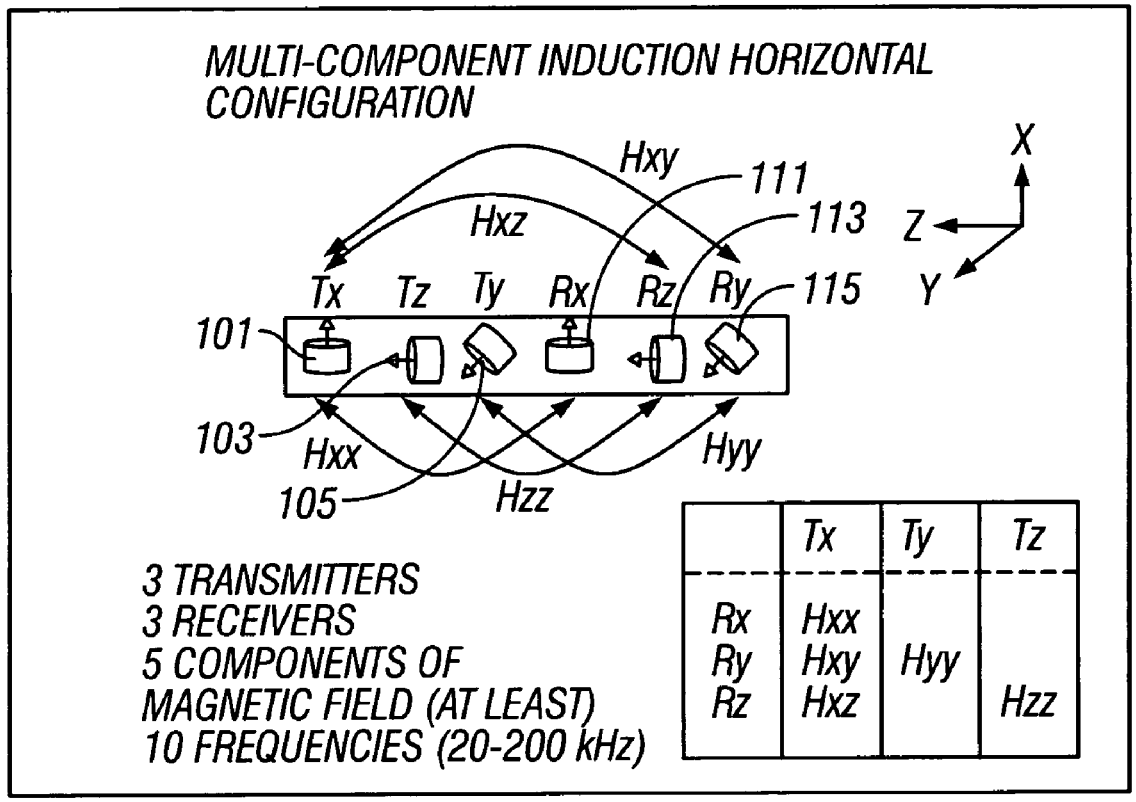
FIG. 1 shows a multi-component induction configuration of the invention for horizontal wells.
Figure 2:
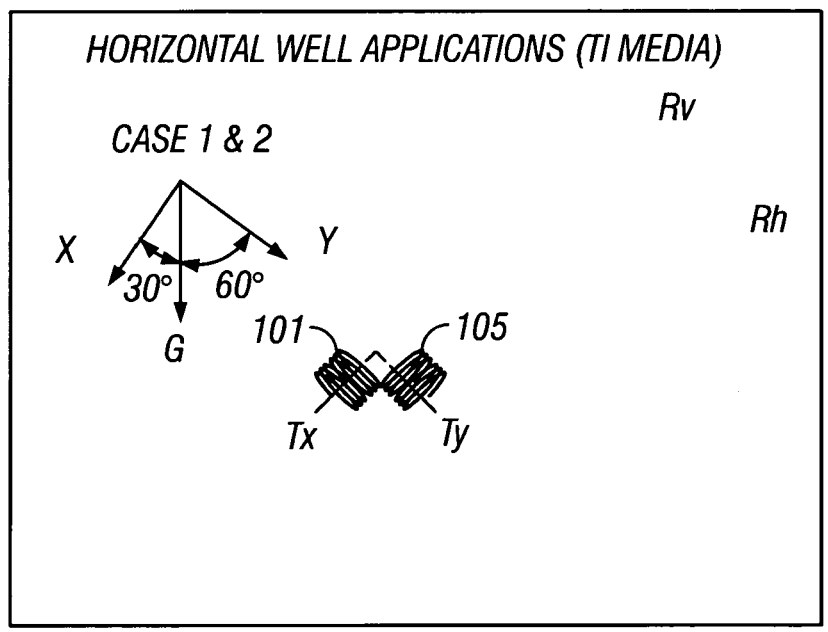
FIG. 2 shows a configuration for a horizontal well application used to obtain results.

FIG. 1 shows the configuration of transmitter and receiver coils in a preferred embodiment of the 3DExplorer™ (3DEX) induction logging instrument of Baker Hughes. Three orthogonal transmitters 101, 103, and 105 that are referred to as the $T_x$, $T_z$, and $T_y$ transmitters are placed in the order shown. The three transmitters induce magnetic fields in three spatial directions. The subscripts (x, y, z) indicate an orthogonal system substantially defined by the directions of the normals to the transmitters. The z-axis is chosen to be along the longitudinal axis of the tool, while the x-axis and y-axis are mutually perpendicular directions lying in the plane transverse to the axis. Corresponding to each transmitter 101, 103, and 105 are associated receivers 111, 113, and 115, referred to as the $R_x$, $R_z$, and $R_y$ receivers, aligned along the orthogonal system defined by the transmitter normals, placed in the order shown in FIG. 1. $R_x$, $R_z$, and $R_y$ are responsible for measuring the corresponding magnetic fields $H_{xx}$, $H_{zz}$, and $H_{yy}$. Within this system for naming the magnetic fields, the first index indicates the direction of the transmitter and the second index indicates the direction of the receiver. In addition, the receivers $R_y$ and $R_z$, measure two cross-components, $H_{xy}$ and $H_{xz}$, of the magnetic field produced by the $T_x$ transmitter (101). This embodiment of the invention is operable in single frequency or multiple frequency modes.

FIG. 1 shows a sketch of a horizontal configuration for a multi-component induction tool. The orientation of the transmitters and receivers remain fixed with respect to the tool. The multi-component tool in horizontal configuration is sensitive to the anisotropic formation, tool location as well as the rotation of the tool around its axis. Only the $H_{zz}$ component is insensitive to tool rotation. In horizontal configuration, the average $0.5*(H_{xx}+H_{yy})$ is independent of tool rotation. The $H_{zz}$ and $0.5*(H_{xx}+H_{yy})$ measurements are dependent on the formation and the tool location and thus an be used to determine the distance from the bed boundaries and for geo-steering the invention.

The method of the present invention may be used with data acquired with a logging instrument conveyed on a wireline and also with data acquired using a measurements while drilling (MWD) apparatus conveyed on a drilling tubular such as a drill string or coiled tubing. In particular, when used with MWD measurements, this directional information may be used for controlling the direction of drilling and maintaining the position of the borehole relative to beds in the proximity of the borehole.

Directional resistivity may be measured using cross-component coils. One important cross-component combination is a coaxial (Z) transmitter and an orthogonal (X) receiver. Such a combination has the capability of distinguishing targets located above or below, provided that the targets are within the depth of investigation of the device. This capability tells in which way the drill bit is approaching the geologic target.

The challenge with the cross-component measurement for MWD is in building an X-coil to survive in the hostile drilling environment. The present invention provides a groove design for building an X-coil (used as transmitter or receiver) to meet the requirement. This design enables the present invention to radiate/detect transverse magnetic fields and protect the X-coil wire from damages posed by drilling operations.

Figure 3:
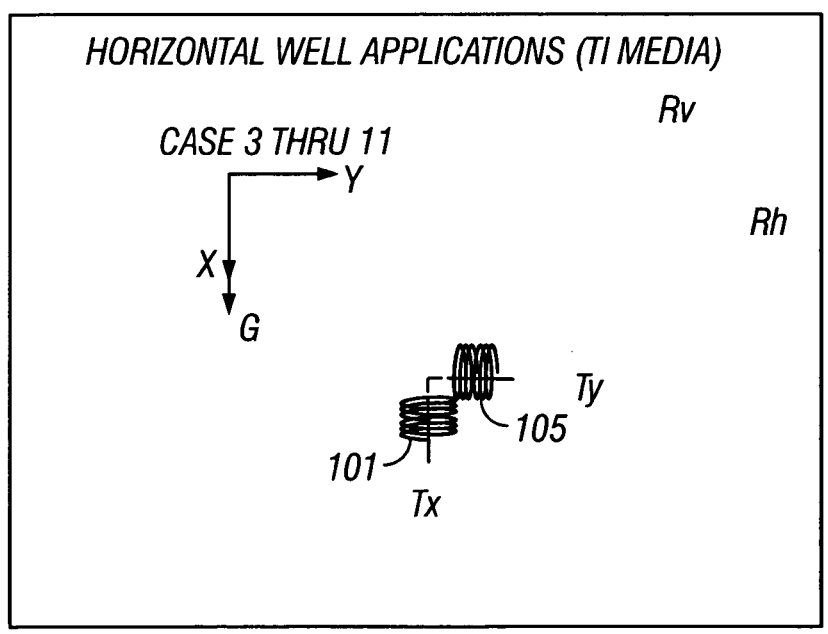
FIG. 3 shows a configuration for a horizontal well application used to obtain results.
Figure 4:
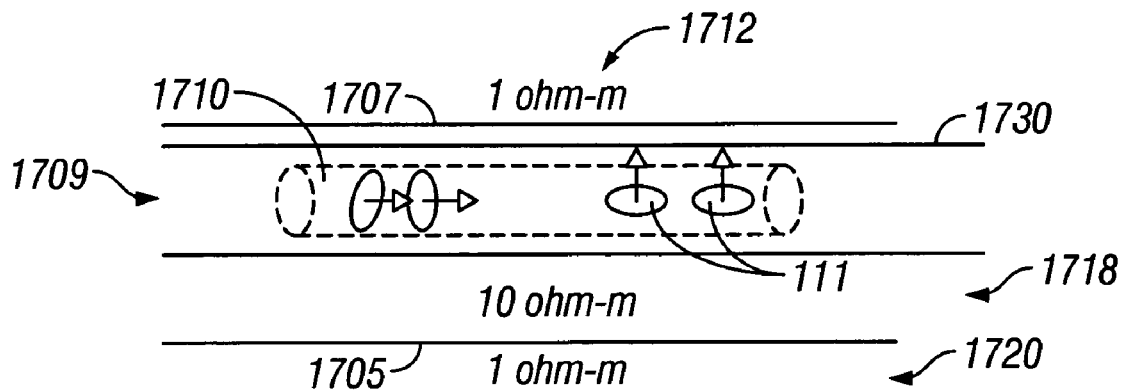
FIG. 4 is an illustration of a downhole tool traversing a substantially horizontal horizontal deviated borehole in a three layer formation.

To illustrate of the directionality of cross-component measurement, FIG. 4 shows the magnetic field measured for a Z-transmitter 1716 and an X-receiver 1714 in a three-layer formation 1709. The tool 1710 is shown traversing a highly deviated borehole 1730 drilled into the formation 1709. The upper 1712 and lower 1720 layers are 1 ohm-m and the middle 1718 layer in which the tool 1710 resides is 10 ohm-m. The transmitter 1716 and receiver 1714 are aligned such that the tool axis is parallel to the bed boundaries 1705 and 1707. As shown in FIG. 3, observe that the magnetic field (imaginary part) changes sign as the tools moves from the upper layer boundary 1810 to the lower one 1812. This sign change provides information for distinguishing layers that are above the tool from layers that are below the tool.

Directional measurement while drilling poses challenge for tool design because of the difficulty in putting a transverse coil. This invention proposes a method for building a transverse coil on a drill collar. The coil detects formation signals and meanwhile stands up to the stress of drilling operation.

Conceptually, a transverse coil can be built by spreading a wire outside the collar surface on the opposite sides of the collar. The wire is then connected at the ends from inside the collar. To intercept signals there must be a gap between the wire and the collar surface at the bottom of the grooves. Because of the damage posed by drilling operations, the wire must be protected by mechanically strong and yet electrically nonconducting material.

Figure 5:
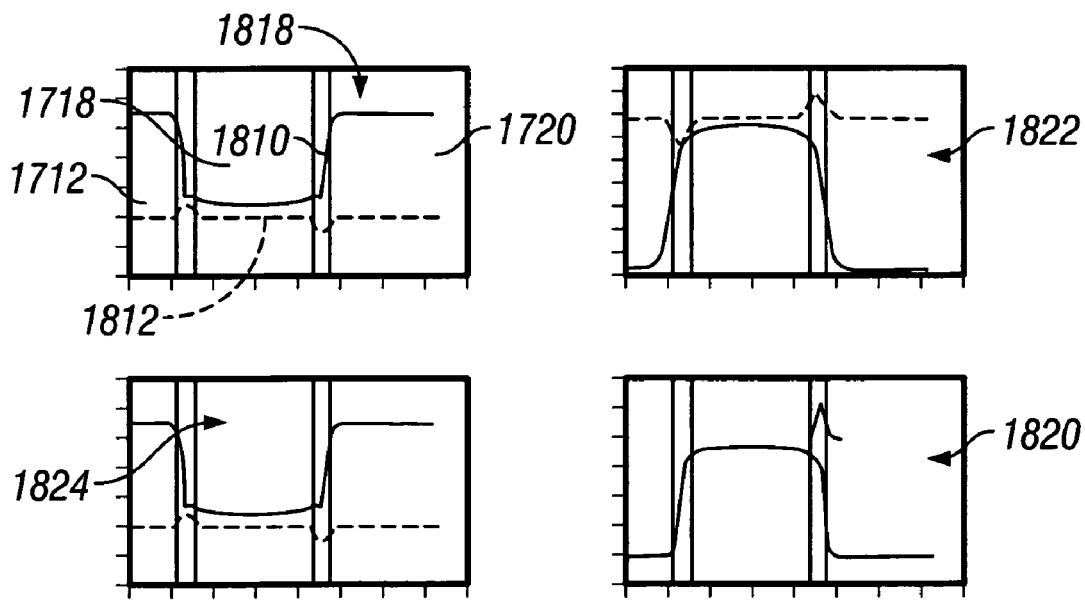
FIG. 5 is an illustration of the magnetic field, in-phase phase real and quadrature quadrature imaginary parts for the ZX transmitter configuration in the three-layer formation shown in FIG. 4.

FIG. 4 shows a design that meets these two requirements. By analog to the vertical grooves 1912 for hosting a coaxial (Z-) coil, a number of horizontal grooves 1914 are cut on the surface of the collar. The grooves are spread out substantially along the collar axis direction. Holes 1917 are then placed beneath the collar surface 1710 in between the grooves 1914 (FIG. 5). An electrically insulated wire 1916 is placed through the holes 1917 and grooves 1914. Within each groove 1914 a small gap 1713 is left between the wire 1916 and the groove bottom 1915. Ferrite materials 1918 may be filled in the gap, as for a Z-coil design. The wires from the opposite sides are connected to form a loop at the ends.

Figure 6:
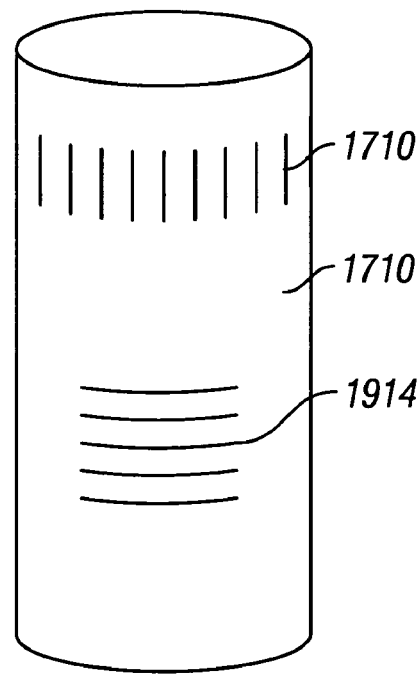
FIG. 6 is an illustration of the arrangement of horizontal grooves cut in tool body or collar to host a transverse coil (X-coil) and vertical grooves used to host a Z-coil.
Figure 7:
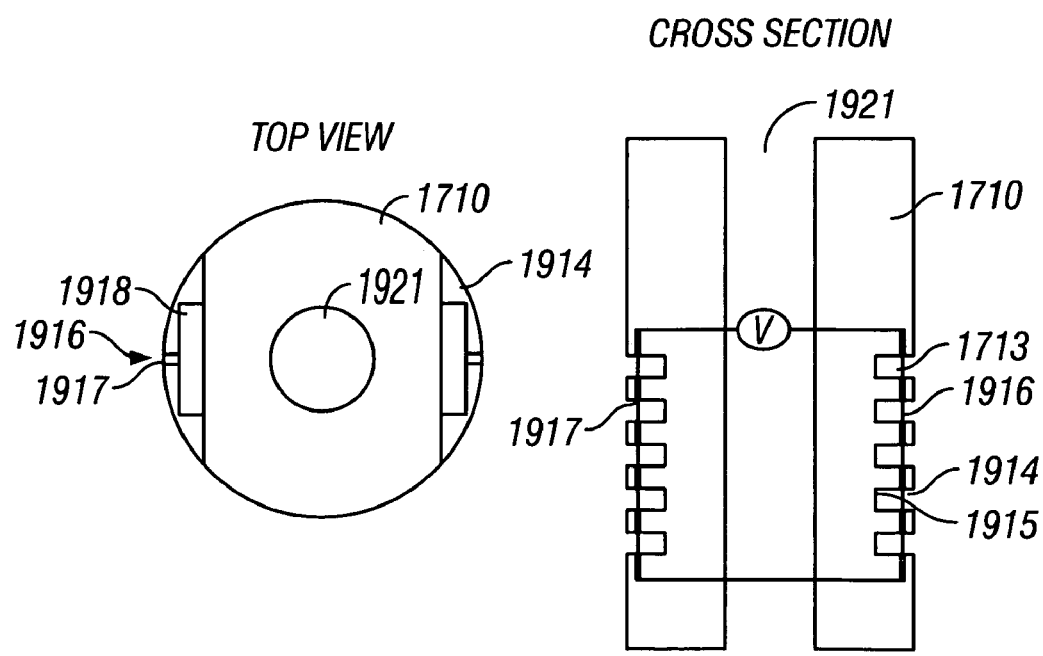
FIG. 7 is a sectional view of the tool shown in FIG. 6 with wire and ferrite inserted in the gaps between the wire and the bottom of the grooves.
Figure 8:
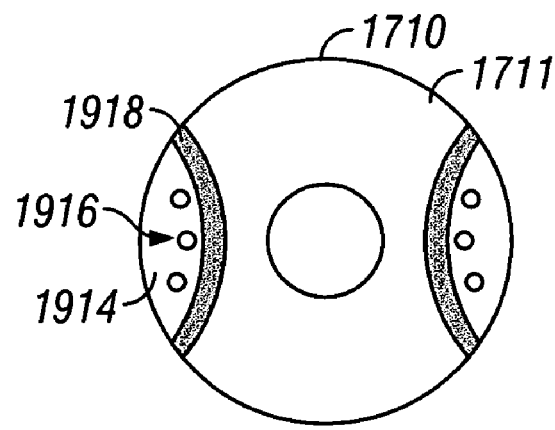
FIG. 8 is a top view of a general groove design showing multiple wires backed by a curved ferrite layer on top of the collar pipe metal.
Figure 9:
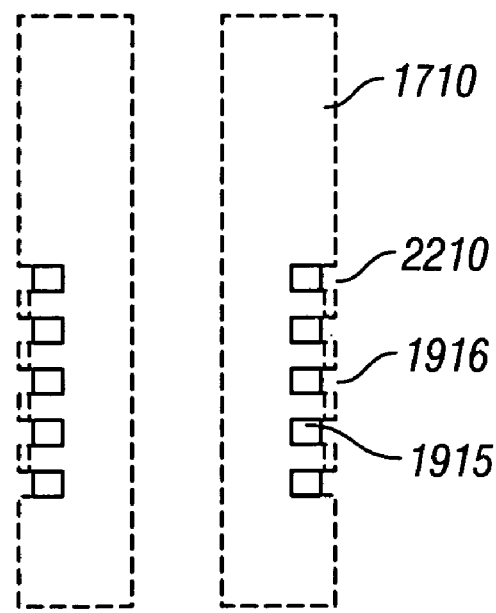
FIG. 9 is an illustration of the equivalent coil system for the transverse loop shown in FIG. 7 wherein the small coils all have the same moment direction and therefore their contributions add to each other and the coil size is given by the gap between the wire an the groove bottom in FIG. 7.
Figure 10:
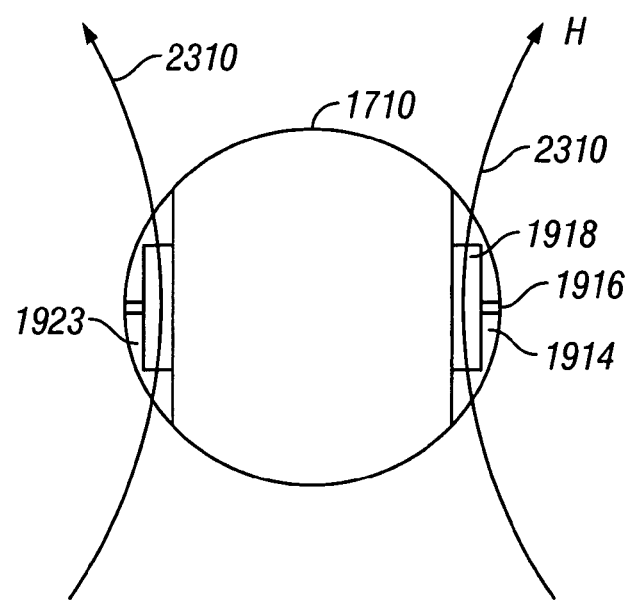
FIG. 10 is an illustration of the magnetic field reception by a transverse coil.
Figure 11:
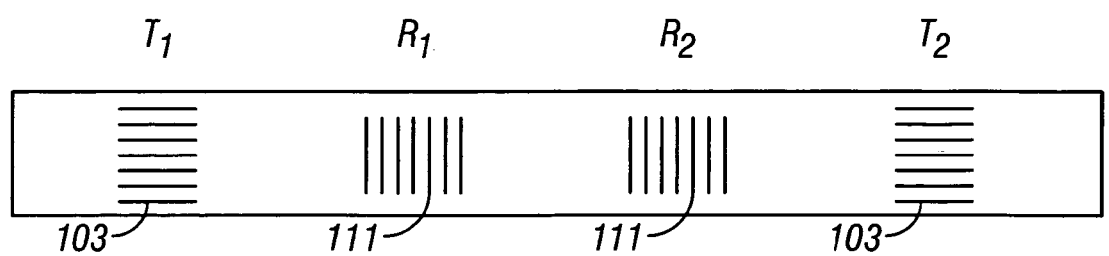
FIG. 11 is an illustration of an arrangement of dual transmitters and dual receivers.

A more general antenna design may use multiple wires 1916 backed by a curved ferrite material 1918 layer on top of the metal pipe wall 1711 (FIG. 6). Because of its high conductivity, a metal drill collar 1710 is nearly a perfect conductor for operating frequencies from a few hundred kilohertz to a few megahertz. In reaction to an electromagnetic field, the collar will produce surface currents that mute the field inside the collar 1710. As a result, the physical wire loop produces/receives no fields except in the groove areas 1914. The effect of the physical wire loop can thus be replaced with small loops 2210, as shown in FIG. 7. The areas of the small loops are given by the gaps between the wire 1916 and the groove bottom 1915. The moments of the small loops all point the same direction and thus responses add to each other. FIG. 8 sketches the magnetic field paths 2310 through the grooved area 1923. For the loop to radiate/receive fields requires that the grooves have open ends in the direction parallel to the field path. FIG. 9 is an illustration of the equivalent coil system for the transverse loop shown in FIG. 7 wherein the small coils all have the same moment direction and therefore their contributions add to each other and the coil size is given by the gap between the wire an the groove bottom in FIG. 7. FIG. 10 is an illustration of the magnetic field reception by a transverse coil; and FIG. 11 is an illustration of an arrangement of dual transmitters and dual receivers.

Even in the simplest case of two layers separated by a single layer boundary, determining the azimuth of a nearby layer may require considering four possible different scenarios: (1) the tool is in a resistive layer overlying a conductive layer, (2) the tool is in a conductive layer overlying a resistive layer, (3) the tool is in a resistive layer underlying a conductive layer, and (4) the tool in a conductive layer underlying a resistive layer. Therefore, four independent measurements are made to uniquely distinguish a nearby layer. This is made possible by measuring both the in-phase and quadrature parts of the cross-component magnetic field. Measurement of in-phase and quadrature components also help eliminate ambiguity in determining the nearby be azimuth. Table 1 lists the signature of both parts for the various scenarios.

TABLE 1

The in-phase and magnetic field signatures for various tool positions and layer structures.

| Tool position | Formation | Inphase | Quadrature |
|---|---|---|---|
| Tool in upper layer | Conductive layer above resistive layer | + | − |
| | Resistive layer above conductive layer | − | − |
| Tool in lower layer | Conductive layer above resistive layer | + | + |
| | Resistive layer above conductive layer | − | + |

The use of the cross-component magnetic field for determination of a nearby layer azimuth relies on the transmitter and receiver coils being orthogonal to each other so that the direct coupling between the coils is absent. In reality, however, the tool may be bent due to the borehole curvature or decentralized due to gravity. Tool bending or eccentricity will destroy the coil orthogonality. In other words, the cross-coil measurement will contain the directly coupled field that may, depending on the severity of tool bending or eccentricity, destroy the usefulness of the cross-component field for azimuthal determination. To suppress tool bending or tool eccentricity effect, a second receiver may be used which is placed in between the first (outer) receiver and the transmitter. The measured in-phase and quadrature fields from the inner and outer receivers are then averaged according to the following formula to provide the final measurement $$H_r = a*H_r^{in} + H_r^{out}$$

$$H_i = a*H_i^{in} + H_i^{out}$$

Where $H_r^{in}$ and $H_r^{out}$ are the in-phase measurements of the inner and receivers, respectively, $H_i^{in}$ and $H_i^{out}$ are the quadrature measurements of the two receivers respectively, and a is a coefficient given by $a = -L_{in}^3/L_{out}^3$, where $L_{in}^3$ and $L_{out}^3$ are the distances of the inner and outer receivers to the transmitter, respectively.

To make reliable measurements, the gains of the two receivers are known and kept constant. However, downhole temperature variations may cause the gains to change slightly. An uncorrected gain variation may destroy the balancing of the two receiver measurement as expressed by equations (1) and (2). To this end, a second transmitter (Z-directed) may be used which is placed symmetrically with respect to the center and on the opposite side of the two receivers. The measurement from each individual transmitter is then averaged to give the final measurement. The second transmitter also helps to remove a receiver gain drift effect.

In another embodiment, the method of the present invention is implemented as a set computer executable of instructions on a computer readable medium, comprising ROM, RAM, CD ROM, Flash or any other computer readable medium, now known or unknown that when executed cause a computer to implement the method of the present invention.

While the foregoing disclosure is directed to the preferred embodiments of the invention various modifications will be apparent to those skilled in the art. It is intended that all variations within the scope of the appended claims be embraced by the foregoing disclosure. Examples of the more important features of the invention have been summarized rather broadly in order that the detailed description thereof that follows may be better understood, and in order that the contributions to the art may be appreciated. There are, of course, additional features of the invention that will be described hereinafter and which will form the subject of the claims appended hereto.

What is claimed is:

1. An apparatus for use in a wellbore in an earth formation comprising:
    (a) a resistivity tool having a body with a longitudinal axis substantially aligned with a longitudinal axis of the well bore, the body having a external surface;
    (b) at least one pair of grooves in said external surface having an orientation substantially orthogonal to said longitudinal axis of said body;
    (c) a first coil antenna placed near the external surface of the tool body, said first coil antenna having an axis substantially orthogonal to said longitudinal axis of said body and to said at least one pair of grooves and positioned in at least one hole intersecting said at least one pair of grooves;
    (d) an antenna core material positioned in said at least one pair of grooves between said first coil antenna and said longitudinal axis of said body; wherein said first antenna and said core material define a plurality of small antenna loops having axes substantially parallel to an axis of said first coil antenna.

2. The apparatus of claim 1, wherein said first coil antenna comprises a transmitter antenna.

3. The apparatus of claim 1, wherein said first coil antenna comprises a receiver antenna.

4. The apparatus of claim 1, wherein said at least one pair of grooves comprises a plurality of pairs of grooves.

5. The apparatus of claim 1, wherein a bottom of said at least one pair of grooves is substantially flat and parallel to said longitudinal axis of said body.

6. The apparatus of claim 1, further comprising
(i) a plurality of grooves in said external surface having an orientation substantially parallel to said longitudinal axis of said body;
(ii) a second coil antenna placed near the external surface of the tool body, said second coil antenna having an axis substantially parallel to said longitudinal axis of said body and positioned in at least one hole intersecting said plurality of grooves.

7. The apparatus of claim 6, wherein one of the first coil antenna and the second coil antenna comprises a transmitter antenna and the other of said first coil antenna and the second coil antenna comprises a receiver antenna.

8. The apparatus of claim 7, further comprising an additional receiver antenna between said transmitter antenna and said receiver antenna, and wherein a weighted average of signals received by said receiver antenna and said additional receiver antenna is indicative of at least one of (i) a distance to said interface, (ii) an orientation of said interface, and, (iii) relative resistivities of earth formations on opposite sides of said interface.

9. The apparatus of claim 1, wherein said antenna core material comprises a ferrite.

10. The apparatus of claim 1, wherein said first antenna is operated at a single frequency.

11. The apparatus of claim 1, wherein said a first antenna is operated at a plurality of frequencies.

12. The apparatus of claim 1, wherein said longitudinal axis of said wellbore is substantially parallel to an interface in said earth formation.

13. The apparatus of claim 12, wherein a signal received at said receiver antenna resulting front activation of said transmitter antenna is indicative of an orientation of said interface relative to said wellbore.

14. The apparatus of claim 12, wherein a signal received from activation of said receiver antenna resulting from activation of said transmitter antenna is indicative of relative resistivities of earth formations on opposite sides of said interface.

15. The apparatus of claim 1, wherein a signal received at said receiver antenna resulting from activation of said transmitter antenna is indicative of a distance to said interface from said wellbore.

16. The apparatus of claim 1, wherein said resistivity tool comprises an induction tool.

17. A method of determining a resistivity property of an earth formation, the method comprising:
(a) conveying a resistivity tool into a well bore in said earth formation, said resistivity tool comprising:
(A) a body with a longitudinal axis substantially aligned with a longitudinal axis of the well bore, the body having a external surface,
(B) at least one pair of grooves in said external surface having an orientation substantially orthogonal to said longitudinal axis of said body,
(C) a coil antenna placed near the external surface of the tool body, said first coil antenna having an axis substantially orthogonal to said longitudinal axis of said body and to said at least one pair of grooves and positioned in at least one hole intersecting said first plurality of grooves, and
(D) an antenna core material positioned in said at least one pair of grooves between said coil antenna and said longitudinal axis of said body;
(b) using said first antenna and said core material for defining a plurality of small antenna loops having axes substantially parallel to an axis of said first coil antenna;
(c) using said resistivity tool for acquiring a cross-component signal from said earth formation; and
(d) determining from said cross-component signal said resistivity property of said earth formation.

18. The method of claim 17, wherein using said resistivity tool for acquiring said cross-component signal further comprises using said coil antenna as a receiver antenna.

19. The method of claim 17, wherein using said resistivity tool for acquiring said cross-component signal further comprises using said coil antenna as a transmitter antenna.

20. The method of claim 17, wherein said resistivity property is at least one of (i) an orientation of a bed boundary in said earth formation relative to said well bore, (ii) a resistivity contrast of said earth formation between a side of a bed boundary in said earth formation proximate to said well bore and a side of said bed boundary distal to said well bore.

21. The method of claim 20, wherein determining said resistivity property of said earth formation further comprises using an additional antenna as a transmitter antenna and analyzing in-phase and quadrature components of said cross-component signal.

22. The method of claim 17, further comprising acquiring said cross-component signal at a plurality of frequencies.

23. The method of claim 17, wherein acquiring said cross-component signal comprises inducing currents in the earth formation.

* * * * *